US009313018B1

(12) United States Patent  
Tyler et al.

(10) Patent No.: US 9,313,018 B1  
(45) Date of Patent: Apr. 12, 2016

(54) CIRCUIT AND METHOD FOR CLOCK RECOVERY OF QUADRATURE AMPLITUDE MODULATED WAVEFORMS

(71) Applicant: THE UNITED STATES OF AMERICA AS REPRESENTED BY THE SECRETARY OF THE AIR FORCE, Washington, DC (US)

(72) Inventors: Stephen C. Tyler, Rome, NY (US); Nathaniel W. Rowe, Clinton, NY (US); Gerard F. Wohlrab, III, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/709,868

(22) Filed: May 12, 2015

(51) Int. Cl.
```
H04L 27/14     (2006.01)
H04L 27/16     (2006.01)
H04L 27/22     (2006.01)
H04L 7/033     (2006.01)
```
(52) U.S. Cl.  
CPC .................................. *H04L 7/0331* (2013.01)

(58) Field of Classification Search  
CPC .. H04L 7/0331; H04L 27/362; H04L 27/3836

USPC ................... 375/326, 329, 261, 279; 329/308  
See application file for complete search history.

(56) References Cited

U.S. PATENT DOCUMENTS

| | | | | | |
|---|---|---|---|---|---|
| 4,404,532 A | * | 9/1983 | Welti | ..................... | H04L 27/362 329/308 |
| 4,546,322 A | * | 10/1985 | Crutcher | ............. | H04L 27/3836 329/308 |

* cited by examiner

*Primary Examiner* — Phuong Phu  
(74) *Attorney, Agent, or Firm* — Joseph A. Mancini

(57) ABSTRACT

Apparatus and method for performing low cost analog clock recovery within a high bandwidth radio frequency communications system. An analog data source is passed through a squaring loop typically utilized for carrier recovery. A squaring loop consists of an analog mixer to multiply one component of the complex signal with itself, a bandpass filter and phase lock loop. The addition of nonlinear gain compression enables clock recovery for higher order modulation schemes to exploit the fundamental phase differences of the individual components that construct the received signal. The output of the phase lock loop drives the Analog-to-Digital converter. It is desired that this signal converges to the symbol clock's frequency and phase of the transmitter, thereby sampling the received baseband signal at the desired symbol levels.

2 Claims, 6 Drawing Sheets

CIRCUIT AND METHOD FOR CLOCK RECOVERY OF QUADRATURE AMPLITUDE MODULATED WAVEFORMS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to high bandwidth radio frequency receivers, and, more specifically, to radio frequency receivers wherein blind recovery of a transmitter symbol clock is necessary for reconstruction of data at that receiver.

Clock recovery of a transmitted radio frequency waveform is necessary when digitally sampling the analog waveform at a receiver. The recovered clock must be phase and frequency locked to the transmitted symbol clock, and with sufficiently low noise to reduce the likelihood of sampling the analog data at a non-ideal point in time. Clock recovery is necessary for many wireless communication systems. However, some scenarios exist which provide a challenge to adequate recovery.

When a phase-locked reference signal is transmitted alongside its digital-to-analog converted (DAC) waveform, a receiver can use the reference signal to sample the received data at the analog-to-digital converter (ADC). Often, however, a reference signal is not sent with a waveform and thus must be derived from the data itself. This type of blind recovery of a transmitted symbol clock can be challenging for simple modulation schemes such as Binary Phase Shift Keying (BPSK) and Quadrature Phase Shift Keying (QPSK), and becomes a more significant challenge for high order Quadrature Amplitude Modulation (QAM) schemes, such as 16-QAM. This is because most blind recovery schemes rely on regular zero-crossings in the data to derive the reference frequency. With high order modulation data the number of zero-crossings is potentially reduced and the recovery technique may have trouble making a decision on the clock frequency.

In addition to this challenge, many recovery schemes are designed to recover the clock of a single modulation scheme. Dynamic modulation techniques such as those with the ability to adjust to changing atmospheric or topological conditions means a recovery technique must be powerful enough to support these changes while maintaining relatively low cost and complexity.

Finally, a number of clock recovery solutions exist which rely on the ability to oversample received data and thereby reconstruct a reference clock in the digital domain. However, as signal bandwidths continue to increase the reliance on high-speed ADCs to sufficiently oversample that signal is also increasing, along with cost and complexity of the intended receiver.

An optimal solution to the blind recovery of a high order modulation symbol clock should be one that is relatively simple, low cost, and does not require oversampling of a received waveform at the ADC. The prior art has been able to isolate some of these parameters independently, but has failed to optimize for all parameters at once.

In U.S. Pat. No. 5,982,200, a Costas loop is identified to perform carrier recovery of a waveform. This provides the ability to recover a signal's center operating frequency and downconvert to a lower frequency or baseband. This Costas loop utilizes two square-law circuits to perform recovery of the carrier sinusoid. However, this operation targets carrier recovery as opposed to clock recovery, and targets QPSK as opposed to high-order modulation schemes.

In U.S. Pat. No. 5,519,733, carrier recovery of high order modulation is performed using a phase detection system with a phase lock loop. While providing detection of high order QAM, the patent uses a more complex detection system than the squaring law, and recovers the carrier of a waveform as opposed to the sinusoidal clock signal.

In U.S. Pat. No. 6,278,741, a software-based timing recovery technique is presented. While this technique is potentially powerful for low bandwidth applications where a receiver ADC can oversample a waveform to achieve more flexibility of design in the software domain, such a method is impractical for high bandwidth signals due to limitations of ADC sample rates.

In U.S. Pat. No. 5,825,825, an analog clock recovery technique is shown for recovery of the fundamental sinusoid from a baseband waveform. This process has the potential to recover a clock from a high order QAM waveform. However, the design is complex, requiring multiple digital-to-analog and analog-to-digital waveform conversions and components. Additionally, the technique requires high-speed digital components which may not support high frequency clock recovery.

In U.S. Pat. No. 7,933,362, a detection technique is presented which utilizes pilot signals and unique word synchronization for recovery. Such a method can be used efficiently, without the need for a squaring loop implementation. However, since this technique requires pilot tones, it fundamentally requires a synchronization sinusoid to be sent along with the target data. This minimizes the bandwidth dedicated to data transmission and is no longer considered a blind clock recovery detection technique. Depending on the implementation, an oversampling ADC may also be required.

OBJECTS AND SUMMARY OF THE INVENTION

It is therefore an object of the present invention to provide an apparatus that overcomes the prior art's dependency on costly oversampling receiver ADCs to perform symbol clock recovery of high order QAM in the analog domain.

It is a further object of the present invention to provide a reduction in analog radio frequency components in the clock recovery design, such that a symbol clock may be recovered from any QAM waveform without additional circuitry or complex analog switching circuitry.

It is still a further object of the present invention to provide an apparatus wherein a symbol clock can be derived from a QAM waveform blindly, without transmitting a phase-locked version of the DAC clock or other a-priori knowledge, thereby only relying on the downconverted waveform itself.

It is yet still a further object of the present invention to provide an apparatus that is capable of recovering a symbol clock from both narrow-band and wide-band signals, whereas the blind recovery process occurs regardless of data-rate or occupied spectral bandwidth, and relies only on the frequency of the original symbol clock.

Briefly stated, the present invention achieves these and other objects through the use of the square law timing recovery (SLTR) method more generally used for low-order carrier recovery.

SLTR is a simple and widely used recovery method for recovering sinusoidal synchronization signals in cases where a synchronization signal is not provided from a communications transmitter to a receiver. Recovery of such a sinusoid is generally one which is phase locked as well as a frequency multiple of the carrier clock. Thus SLTR is generally used for downconverting a radio frequency (RF) or intermediate frequency (IF) waveform to its baseband equivalent.

In the case of carrier recovery of amplitude modulated waveforms, the order N of the squaring block is generally chosen such that it is equivalent to the order of the received waveform y(t). For example, a 2-QAM waveform (BPSK) would require a squaring block of order N=2, while a 4-QAM (QPSK) waveform would require an order of N=4. The reason for this is shown in Equations (1-2), for a BPSK waveform.

$$y(t) = A \cos(\omega t - \phi), \phi = 0, 180 \text{ degrees} \quad (1)$$

$$y(t)^2 = A^2/2[1 + \cos(2\omega t + 2\phi)], 2\phi = 0, 360 \text{ degrees}$$

$$y(t)^2 = (A^2/2) + (A^2/2)\cos(2\omega t) \quad (2)$$

The BPSK waveform y(t) is shown in Equation (1), where A is some amplitude, $\omega$ is the fundamental frequency and $\phi$ is the phase. Squaring the BPSK waveform gives rise to a DC term as well as a sinusoid at twice the fundamental frequency as shown in Equation (2). While the original BPSK waveform exhibited a phase component dependent on the value of the transmitted data, the phase information in Equation (2) has been canceled out. A bandpass filter is then applied to the signal to remove the unwanted DC component and isolate the desired reference frequency. A similar process can be shown using QPSK with the squaring order N=4.

However, this process breaks down when attempting to apply it to higher-order modulation schemes such as 16-QAM. In this case all transmitted symbols are not even phase multiples of 360 degrees, and thus repeated squaring processes will not eliminate all phase components. Because of this, SLTR is generally not considered for signal orders higher than QPSK.

Even so, the SLTR process can be applied to clock recovery of baseband 16-QAM and higher order QAM signals, which is the basis of this invention. This is because once the QAM waveform has been downconverted to baseband, it is separated into its original in-phase and quadrature-phase components. Each of these components are fundamentally an amplitude-modulated BPSK waveform. By passing the downconverted in-phase (or quadrature-phase) signal shown in Equation (3) through a second order squaring block as identified in Equation (4), the following process occurs.

$$m(t) = Ax \cos(\omega t + \phi), \phi = 0, 180 \text{ degrees} \quad (3)$$

$$m(t)^2 = A^2 x^2/2[1 + \cos(2\omega + 2\phi)], 2\phi = 0, 360 \text{ degrees}$$

$$m(t)^2 = (A^2 x^2/2) + (A^2 x^2/2)\cos(2\omega t) \quad (4)$$

As in the BPSK carrier recovery example, the squared signal in Equation (4) is filtered to remove the DC component and leave a sinusoid at twice the original fundamental frequency. Because each downconverted QAM channel consists of only two phase components separated by 180 degrees, the order of the squaring block will never need to be higher than N=2 for any order QAM signal. Unlike the BPSK example, an additional gain term x exists which results in an additional amplitude modulation. This term can be removed with an amplifier operating in compression or other non-linear device. This process is not unique to 16-QAM, but can be applied to any order square QAM scheme using an N=2 square law.

Therefore, it is accurate to say that while the present invention (1.) utilizes square law timing recovery as the prior art requires to achieve the same; (2.) and while the present invention can blindly recover a waveform's symbol clock as prior art requires to achieve the same; the present invention provides a solution lacking in the prior art because it (3.) can blindly recover the symbol clock for high-order QAM without the need for oversampling of the waveform at the receiver ADC or complex switching of analog hardware as the QAM waveform's order changes. As such, the present invention represents a significant departure from prior art methods.

According to an embodiment of the invention, apparatus for performing blind clock recovery of high order QAM comprises: a squaring block to square the incoming QAM waveform, a bandpass filter with a frequency bandwidth sufficiently small to provide adequate recovery signal-to-noise ratio, a non-linear device such as a comparator or amplifier operating in compression to remove amplitude modulation, and a phase lock loop to reduce phase noise and derive the resultant sinusoid.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
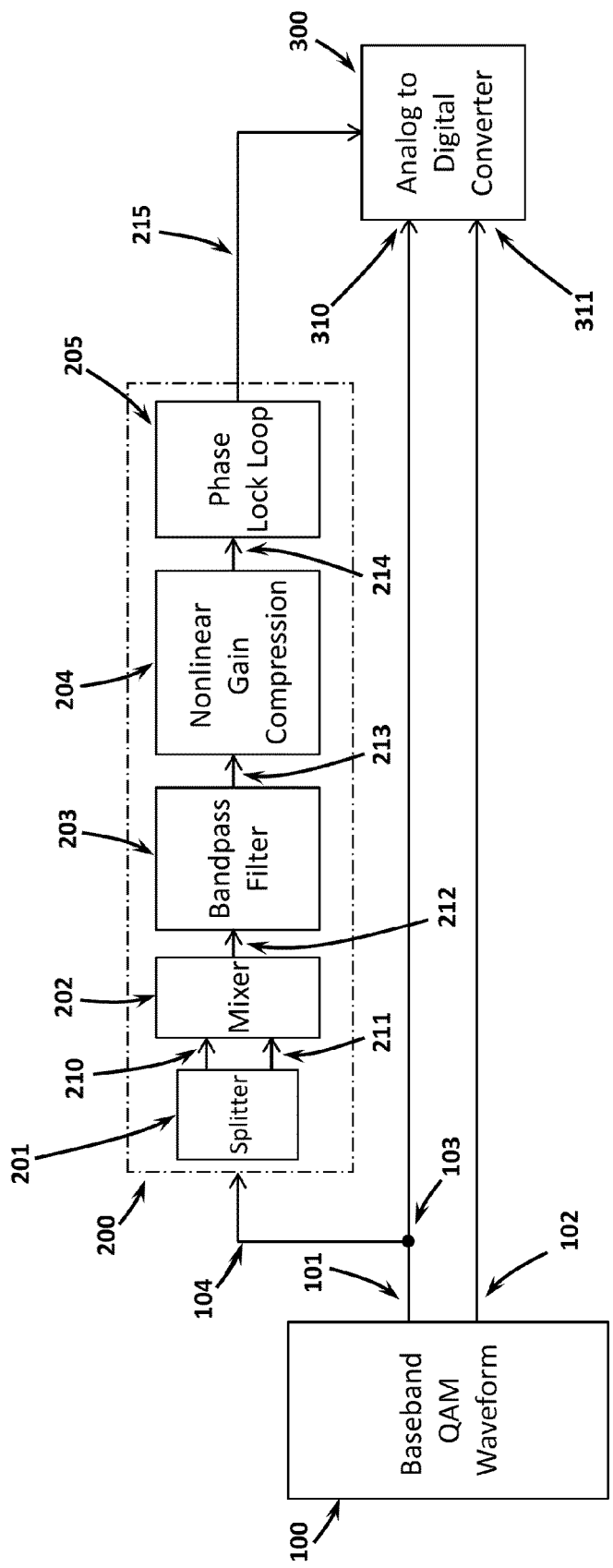
FIG. 1 is a block diagram representation of the blind clock recovery scheme within the receiver processing chain.

Referring to FIG. 1, the key components of the blind clock recovery scheme are the analog baseband data source 100, the analog clock recovery circuit 200, and ADC 300. The baseband data source 100 consists of in-phase 101 and quadrature-phase 102 components. The present invention is able to operate on either the in phase signal at 101 or the quadrature-phase signal at 102; however, it is shown in FIG. 1 that the in-phase component at 101 is used. This signal is coupled by 103 allowing the signal to be used for clock recovery 104 and data sampling 300.

Figure 3:
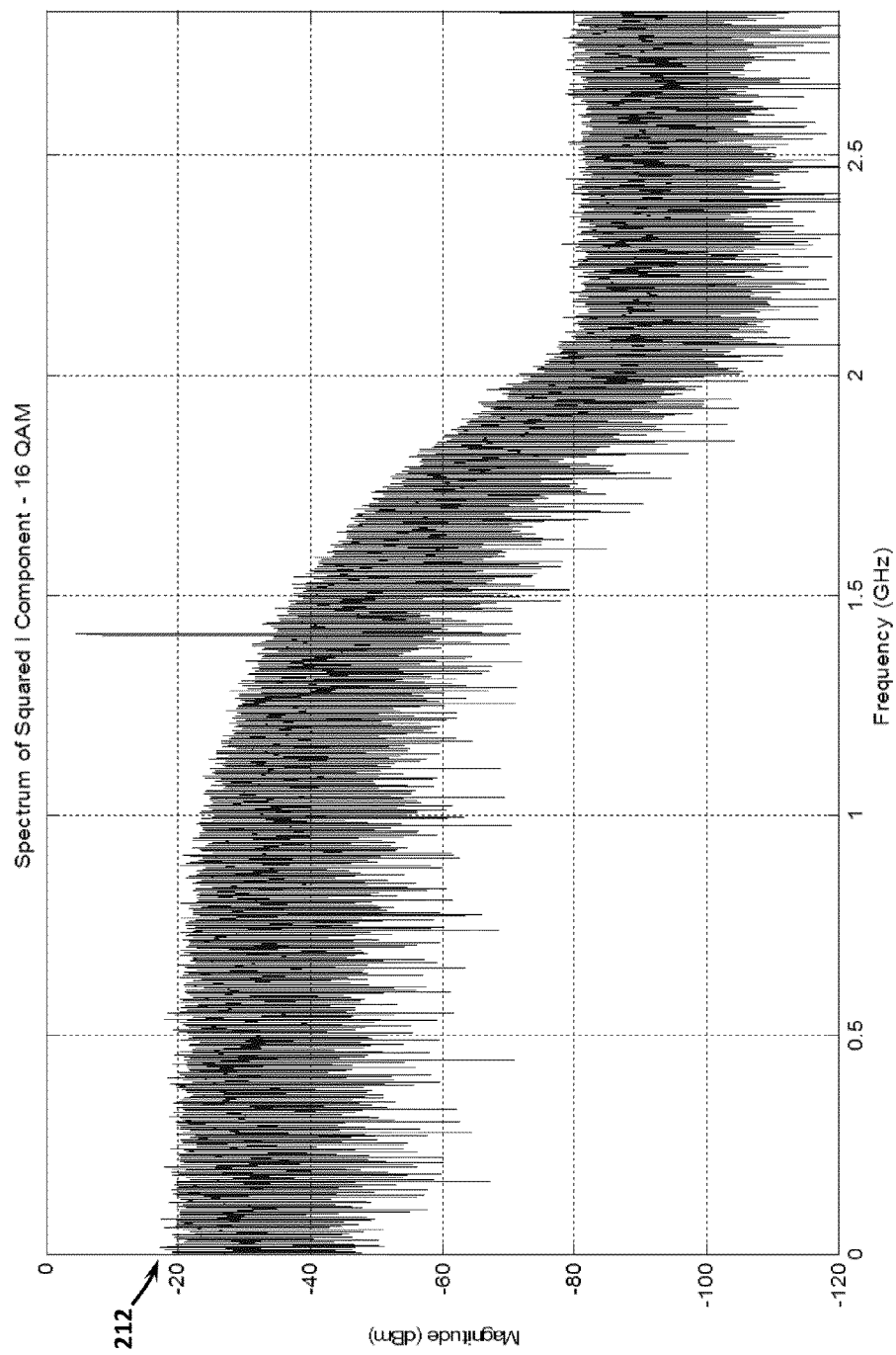
FIG. 3 is the spectrum resulting from squaring signal from FIG. 2 (mixing the signal with itself).

Still referring to FIG. 1, the signal at 104 enters the analog clock recovery circuit and is split once more by 201, creating two identical signals at 210 and at 211 in terms of content and power level. The squaring of the signals at 210 and at 211 is performed by mixer 202 resulting in the signal at 212. The tone located around 1.4 GHz in FIG. 3 is the symbol clock and signal of which to recover. Referring back to FIG. 1, the output signal at 212 is bandpass filtered by 203 to isolate the symbol clock tone, resulting in the signal at 213. This signal has extensive amplitude modulation due to the multiple signal levels conveying information by the higher order modulation. A nonlinear gain compression device 204 is used to remove the variation of signal envelope, creating the signal at 214. This signal is the input to a standard phase lock loop (PLL) 205 which converges to the desired symbol clock. The output signal at 215 drives the frequency and phase of the ADC sampling 300. The ADC clock is continually refined with incoming data to counteract any channel impairments or platform mobility causing drift on the symbol clock.

Figure 2:
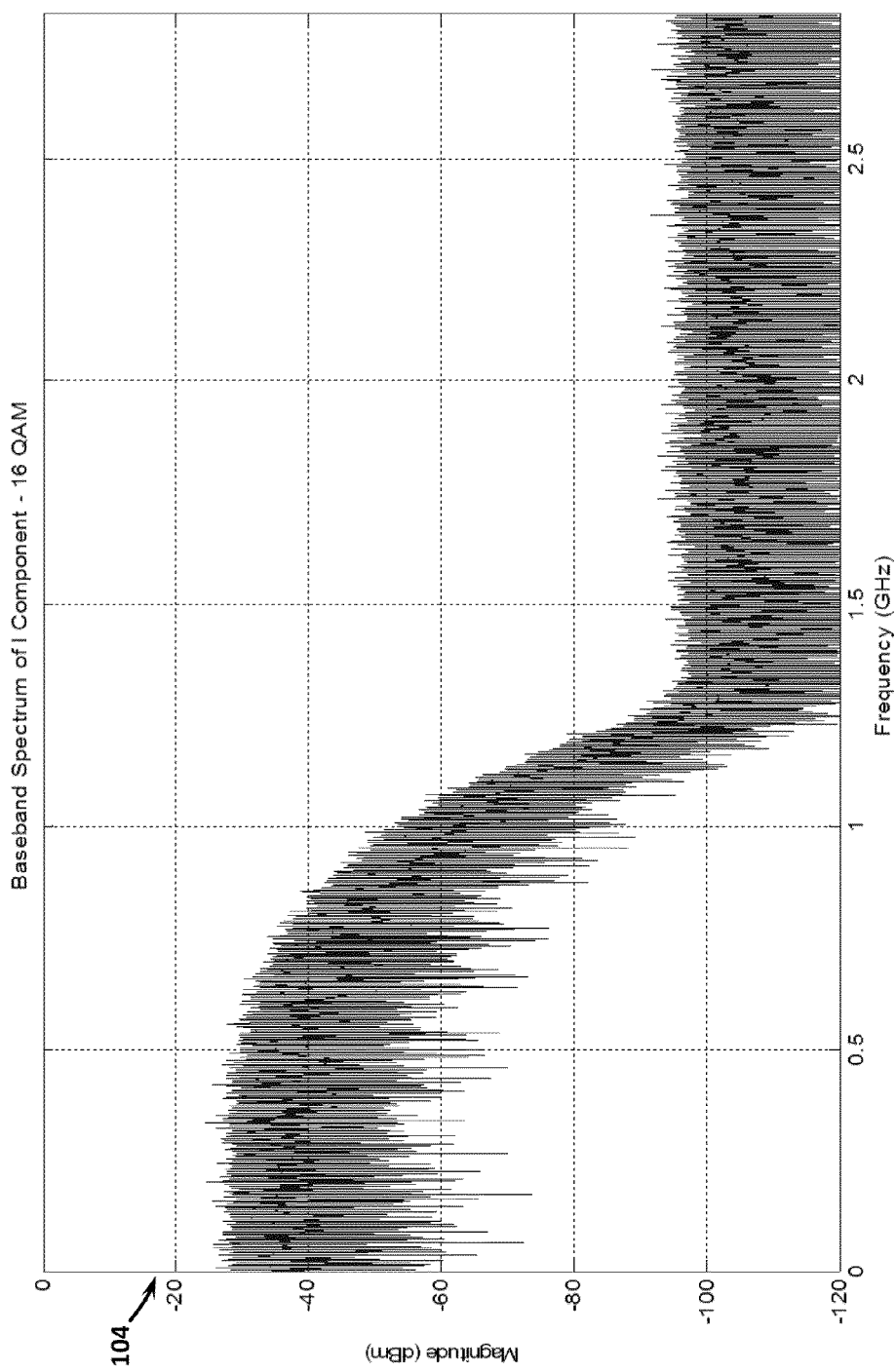
FIG. 2 is an example baseband spectrum of the in-phase component of the received 16-QAM signal.

Referring to FIG. 2, the analog baseband signal in-phase component's spectrum is shown. This is frequency domain representation of the signal at 104.

Referring to FIG. 3, the analog spectrum of the signal at 212 is shown. This is frequency domain representation of the signal after squaring the in-phase component of the received signal.

Figure 4:
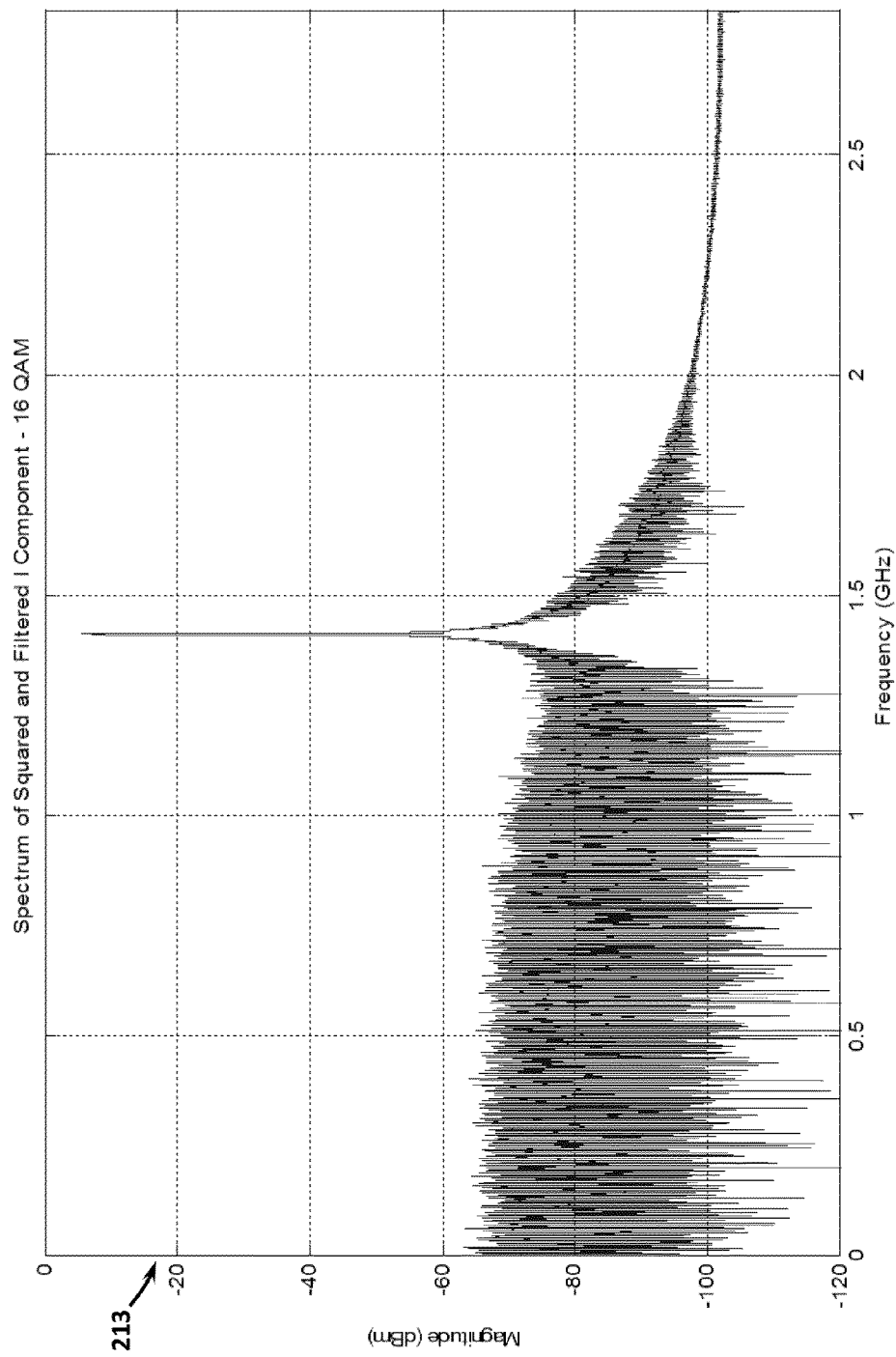
FIG. 4 is the spectrum resulting from band-pass filtering the signal from FIG. 3 about the symbol clock frequency.

Referring to FIG. 4, the analog spectrum of the signal at 213 is shown. This is frequency domain representation of the signal after bandpass filtering the square of the in-phase component of the received signal.

Figure 5:
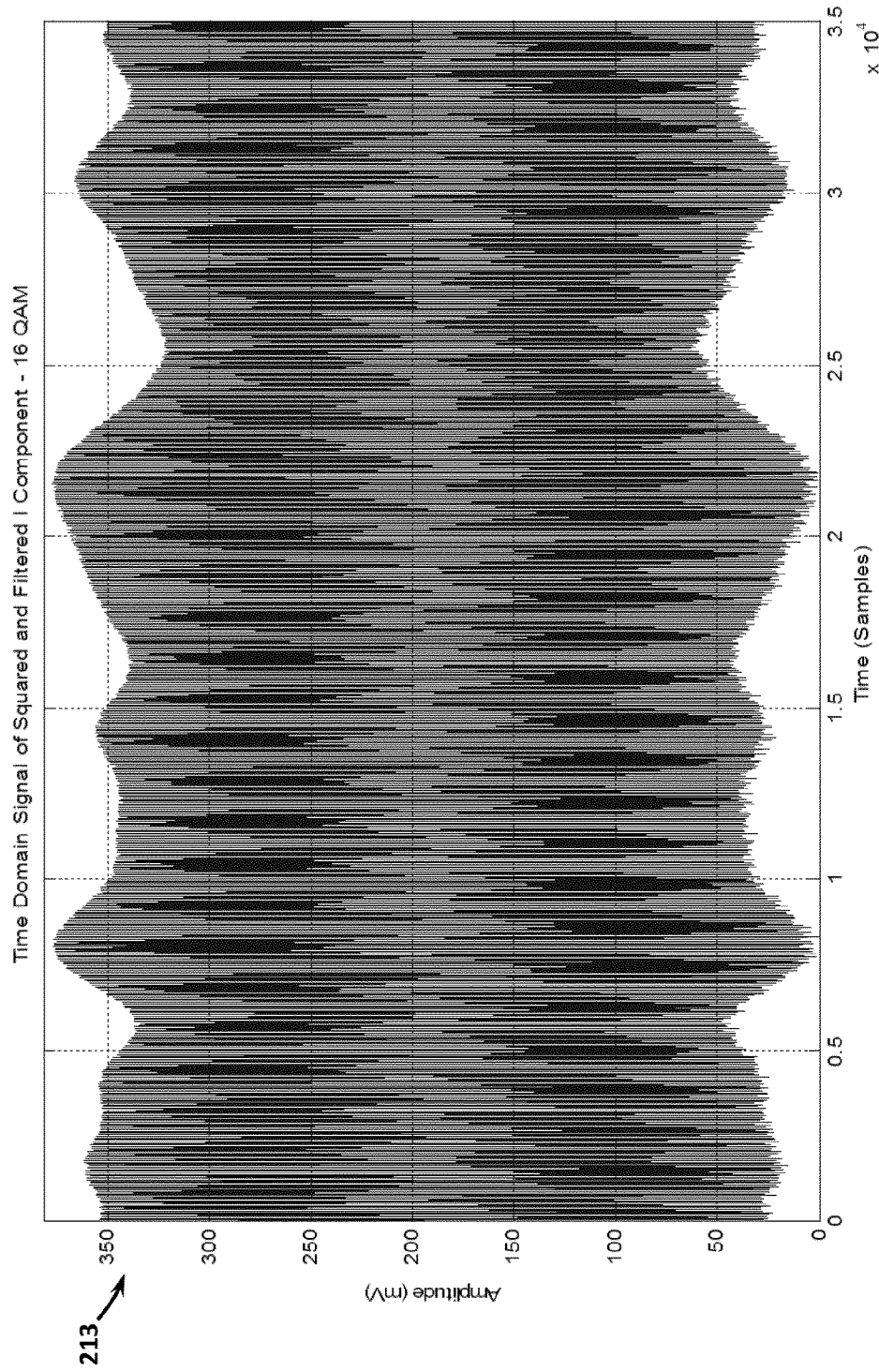
FIG. 5 is the time-domain representation of the signal in FIG. 4 with extensive amplitude-modulation on the desired signal.

Referring to FIG. 5, the analog signal at 213 is shown. This is the time domain representation of the signal after bandpass filtering the square of the in-phase component of the received signal.

Figure 6:
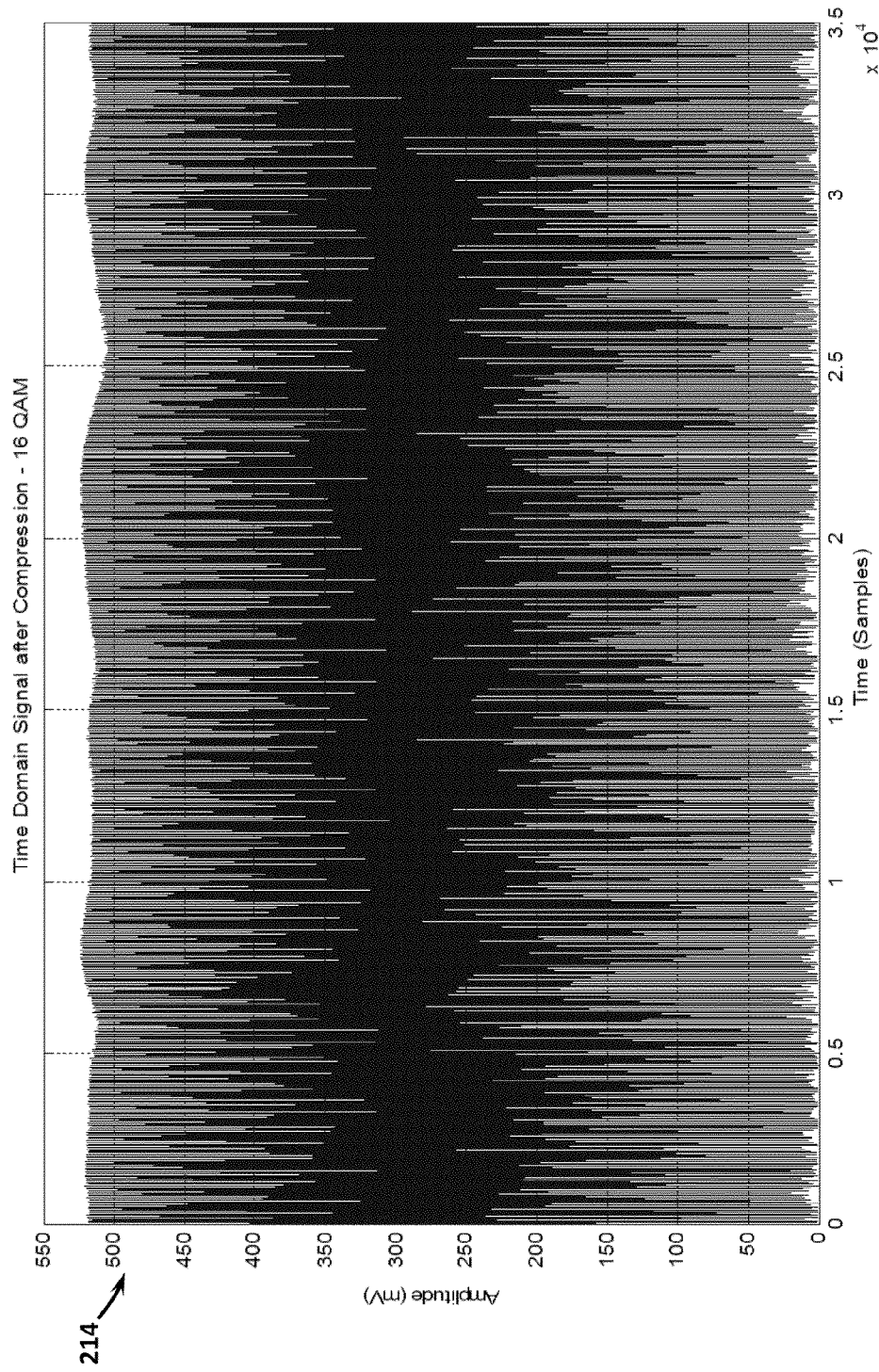
FIG. 6 is the time-domain representation of the signal in FIG. 5 after non-linear gain compression to remove amplitude-modulation on the desired signal.

Referring to FIG. 6, the analog signal at 214 is shown. This is time domain representation of the signal after passing the bandpass filtered signal at 213 through nonlinear gain compression 204.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A circuit apparatus for communications signal clock recovery, comprising:
   a source of an in-phase and a quadrature-phase baseband QAM signal;
   a coupler having an input, an output and a coupled output;
   a clock recovery unit having an input and an output;
   an analog-to-digital converter having an in-phase input, a quadrature-phase input and a clock input; wherein
      said in-phase baseband QAM signal is input into said coupler;
      said output of said coupler is connected to said in-phase input of said analog-to-digital converter;
      said coupled output of said coupler is connected to said input of said clock recovery unit;
      said quadrature-phase baseband QAM signal is input into said quadrature-phase input of said analog-to-digital converter; and
      said output of said clock recovery unit is connected to said clock input of said analog-to-digital converter;
   wherein said clock recovery unit further comprises:
      a splitter having an input and a first output and a second output;
      a mixer having a first input and a second input;
      a bandpass filter having an input and an output;
      a nonlinear gain compressor having an input and an output; and
      a phase locked loop having an input and an output; wherein
         said splitter input is connected to said clock recovery unit input;
         said splitter first output is connected to said mixer first input;
         said splitter second output is connected to said mixer second input;
         said mixer output is connected to said bandpass filter input;
         said bandpass filter output is connected to said nonlinear gain compressor input;
         said nonlinear gain compressor output is connected to said phase locked loop input; and
         said phase locked loop output is connected to said clock recovery unit output.

2. The circuit apparatus of claim 1, wherein
   said quadrature-phase baseband QAM signal is input into said coupler;
   said output of said coupler is connected to said quadrature-phase input of said analog-to-digital converter; and
   said in-phase baseband QAM signal is input into said in-phase input of said analog-to-digital converter.

* * * * *